(12) United States Patent
Saitoh et al.

(10) Patent No.: US 8,971,404 B2
(45) Date of Patent: Mar. 3, 2015

(54) DIGITAL BROADCAST RECEIVING APPARATUS, DIGITAL BROADCAST RECEIVING METHOD AND COMPUTER PROGRAM

(75) Inventors: Kensaku Saitoh, Tokyo (JP); Keiichi Shirasuka, Tokyo (JP); Soichiro Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 496 days.

(21) Appl. No.: 13/513,546

(22) PCT Filed: Oct. 27, 2010

(86) PCT No.: PCT/JP2010/006340
§ 371 (c)(1),
(2), (4) Date: Jun. 1, 2012

(87) PCT Pub. No.: WO2011/070707
PCT Pub. Date: Jun. 16, 2011

(65) Prior Publication Data
US 2012/0236933 A1 Sep. 20, 2012

(30) Foreign Application Priority Data

Dec. 9, 2009 (JP) ................................ 2009-279316

(51) Int. Cl.
*H04N 7/12* (2006.01)
*H04L 12/16* (2006.01)
(Continued)

(52) U.S. Cl.
CPC ......... *H04N 5/4401* (2013.01); *H04N 21/4263* (2013.01); *H04N 21/4384* (2013.01)
USPC ....................... 375/240.02; 370/252; 725/131

(58) Field of Classification Search
CPC . H04N 7/50; H04N 7/26244; H04N 7/26271; H04N 7/26053; H04N 7/26941; H04N 7/173; H04N 21/4782; H04N 21/8586; H04N 21/4788

USPC ......... 375/240.01–2; 370/252, 254–255, 390, 370/400–401, 486–487; 725/131
See application file for complete search history.

(56) References Cited

U.S. PATENT DOCUMENTS

| | | |
|---|---|---|
| 5,864,358 A | 1/1999 | Suzuki et al. |
| 6,157,673 A | 12/2000 | Cuccia |

(Continued)

FOREIGN PATENT DOCUMENTS

| | | |
|---|---|---|
| EP | 0 966 121 A2 | 12/1999 |
| JP | 09-009156 A | 1/1997 |

(Continued)

OTHER PUBLICATIONS

"Operational Guidelines for Digital Terrestrial Television Broadcasting, ARIB Techinical Report, ARIB TR B-14 3.9", Association of Radio Industries and Businesses, pp. 4-56-4-59, Jul. 29, 2009.

(Continued)

*Primary Examiner* — Nhon Diep
*Assistant Examiner* — Tsion B Owens
(74) *Attorney, Agent, or Firm* — Birch, Stewart, Kolasch & Birch, LLP (57) ABSTRACT

A digital broadcast receiving apparatus with enhanced tuning speed is provided. The digital broadcast receiving apparatus includes a data separating unit that separates the encoded stream of a tuned broadcast program and a plurality of latest tuning information from a digital broadcast stream, on the basis of stored tuning information recorded in a tuning information table, a decoding unit that performs a decoding process on the separated encoded stream, and a tuning control unit. The tuning control unit concurrently executes a first reception confirmation process to decide whether first tuning information included in the latest tuning information is consistent with the stored tuning information and a second reception confirmation process to decide whether second tuning information in the latest tuning information is consistent with the stored tuning information. The tuning control unit executes the first and second reception confirmation processes concurrently with the decoding process.

26 Claims, 6 Drawing Sheets

(51) Int. Cl.
*H04N 7/173* (2011.01)
*H04N 5/44* (2011.01)
*H04N 21/426* (2011.01)
*H04N 21/438* (2011.01)

(56) References Cited

U.S. PATENT DOCUMENTS

| | | |
|---|---|---|
| 6,598,233 B1 | 7/2003 | Choi |
| 2006/0140219 A1* | 6/2006 | Kawasaki et al. ............. 370/487 |
| 2007/0130612 A1 | 6/2007 | Kim et al. |
| 2010/0271560 A1* | 10/2010 | Higuchi et al. ............... 348/738 |
| 2011/0157479 A1* | 6/2011 | Higuchi et al. ............... 348/734 |
| 2012/0008719 A1* | 1/2012 | Shirasuka et al. ............ 375/316 |

FOREIGN PATENT DOCUMENTS

| | | |
|---|---|---|
| JP | 09-130764 A | 5/1997 |
| JP | 11-275476 A | 10/1999 |
| JP | 2000-013696 A | 10/1999 |
| JP | 2000-505988 | 5/2000 |
| JP | 2001-016513 A | 1/2001 |
| JP | 2001-160928 A | 6/2001 |
| JP | 2003-250134 A | 9/2003 |
| JP | 3549442 B2 | 8/2004 |
| JP | 3549461 B2 | 8/2004 |
| JP | 2005-260401 A | 9/2005 |
| JP | 2007-288811 A | 11/2007 |
| JP | 2008-035377 A | 2/2008 |
| JP | 2008-187353 A | 8/2008 |

OTHER PUBLICATIONS

"Video Coding, Audio Coding and Multiplexing Specifications for Digital Boadcasting, ARIB Standard, ARIB STD-B32 2.2", Association of Radio Industries and Businesses, pp. 56-57, Jul. 29, 2009.

* cited by examiner

FIG. 1

| SERVICE ID | FREQUENCY BAND | LATEST UPDATE TIME | | |
|---|---|---|---|---|
| PAT INFORMATION | VERSION NUMBER | PMT PID | | |
| PMT INFORMATION | VERSION NUMBER | PCR PID | VIDEO ES PID | AUDIO ES PID |

DIGITAL BROADCAST RECEIVING APPARATUS, DIGITAL BROADCAST RECEIVING METHOD AND COMPUTER PROGRAM

TECHNICAL FIELD

The present invention relates to technology for receiving and decoding digital broadcast signals, and in particular, to technology for receiving a digital broadcast signal and extracting and decoding the encoded streams of a particular broadcast program in the received digital broadcast signal.

BACKGROUND ART

Digital broadcast technology enables multiple broadcast programs (multiple logical channels) to be multiplexed and transmitted simultaneously on a single physical channel (frequency band). Specifically, stream data referred to as an elementary stream (ES) are generated for each broadcast program from the encoded streams (encoded video stream, encoded audio stream, etc.) of multiple broadcast programs. The transmitter can divide the stream data, multiplex the divided stream data, and transmit the multiplexed data on a single physical channel.

When a digital broadcast receiver performs a tuning process, it first sets its tuner to the particular frequency band on which the target broadcast program is carried, and receives the broadcast signal. Next, the digital broadcast receiver obtains information (referred to below as tuning information) necessary for tuning from the digital broadcast stream obtained by receiving the broadcast signal. Then, on the basis of the tuning information, the digital broadcast receiver separates the encoded streams (encoded video stream and encoded audio stream) of the target broadcast program, which are multiplexed in the digital broadcast stream, and decodes the separated encoded streams, thereby reproducing a video picture and sound.

For example, Japanese terrestrial digital broadcasting uses the transport stream format specified by the MPEG-2 system (Moving Picture Experts Group phase 2 system). According to the MPEG-2 system, an ES (Elementary Stream) generated from an encoded stream is divided into data blocks of a suitable size and converted to packet stream data referred to as a PES (Packetized Elementary Stream). Further TS packets (Transport Stream packets), each having a fixed length, are generated from the PES. The transmitter modulates and transmits a transport stream (TS) generated by multiplexing of these TS packets.

The digital broadcast receiver receives the broadcast signal and obtains the digital broadcast stream, i.e., transport stream (TS, below). The digital broadcast receiver refers to a packet identifier (PID) included in the header of each TS packet in the TS and filters the TS to obtain only TS packets relating to the target broadcast program. The digital broadcast receiver can then perform audio output and video output by assembling the filtered TS packets into audio and video ESes and decoding each ES. The Japanese terrestrial digital broadcast standard is disclosed in *ARIB TR-B*14 *Ver.* 3.9 (Non-patent Document 1), *ARIB STD-B*32 *Ver.* 2.2 (Non-patent Document 2), and other ARIB-defined specifications.

The ARIB standard refers to the broadcast programs corresponding to each encoded stream as a service. The broadcast programs, or service, are also referred to as an organized channel, which means a sequence of scheduled broadcast programs (events) organized by a broadcast provider. In tuning to a specific service, program identification information called PSI (program specific information), which is defined by the MPEG-2 system standard, is used as tuning information. The PSI may include four tables: a PAT (program association table), PMT (Program Map Table), NIT (Network Information Table), and CAT (Conditional Access Table). The PAT specifies the PID of the TS packet carrying the PMT relating to the service; the PID of the TS packet carrying the PAT is set to a value of zero. The PAT stores, for all services included in the TS, the service ID (service_id), which is the identification information of each service, and the PID of the TS packet carrying the PMT. The PMT, which is present for each service, is information specifying the PIDs of the TS packets carrying the encoded streams constituting the service.

When a digital broadcast receiver conforming to the ARIB standard performs a tuning process, it first sets its tuner to the particular frequency band on which the target service is being broadcast, and receives the broadcast signal (the frequency tuning process). Next, the digital broadcast receiver refers to the PIDs of the TS packets and receives the PATs, from which it obtains the service IDs. On the basis of the obtained service IDs, the digital broadcast receiver selectively receives a PAT corresponding to the target service and, from the PAT, obtains the PID of the TS packet carrying the PMT corresponding to the target service. The digital broadcast receiver then selectively receives the PMT from the obtained PID, and on the basis of the PMT, it filters the TS packets to obtain those including the encoded audio and video streams and PCR (Program Clock Reference). Sound and picture output can be performed by assembling audio and video ESes from the filtered TS packets and decoding these ESes. Note that a PCR is time stamp information with which the decoder replicates the reference time used when the audio data and video data were encoded.

As described above, the time required for the tuning process is at least the sum of the time required for the frequency tuning process, the time required for selective reception of a PAT (PAT reception waiting process), the time required for selective reception of a PMT (PMT reception waiting time), and the time required for the ES decoding processes. Therefore, as methods of speeding up the tuning process, several methods (referred to below as fast tuning methods) for performing the tuning process by referring to a PAT, PMT, and other tuning information that are obtained beforehand in some way have been proposed. When a fast tuning method is used, the PIDs of the encoded streams and PCRs of each service are stored in advance and the TS packets are filtered on the basis of these PIDs, whereby the decoding process can start shortly after the frequency tuning process.

When the tuning process is performed by use of a fast tuning method, if the content of the previously obtained tuning information has been changed, there is a possibility that the tuning process will be performed incorrectly. For example, the PIDs of an encoded stream described in the PMT might be altered during a broadcast. Therefore, if the TS packet filtering and decoding processes are carried out on the basis of the previously stored PIDs of the encoded stream, a situation might occur in which picture or sound reproduction fails, or the picture of one service and the sound of another service are reproduced simultaneously. In order to avoid such situations, in the tuning process it is necessary to perform a process of checking for the presence of alterations in the tuning information, and when an alteration of the tuning information is recognized, the tuning process must be performed by use of newly received tuning information. One fast tuning method of this type is disclosed in Japanese Patent No. 3549442 (Patent Document 1).

In the fast tuning method in Patent Document 1, the ECM (Entitlement Control Message) employed in scrambled broadcasting is used as tuning information in addition to the PAT and PMT, and the PID of the PMT and the PID of the ECM are recorded in advance for each service. The TS packets carrying the PAT, PMT, and ECM are filtered concurrently, and whether the PIDs of the received PAT, PMT, and ECM match the recorded PIDs of the PAT, PMT, and ECM is determined. The fast tuning method in Patent Document 1 speeds up the tuning process by concurrently receiving multiple items of tuning information, which were received sequentially in the conventional tuning process.

PRIOR ART REFERENCES

Patent Documents

Patent Document 1: Japanese Patent No. 3549442

Non-Patent Documents

Non-patent Document 1: *Chijo dejitaru terebijon hoso unyo kitei: Gijutsu shiryo* (Operational guidelines for terrestrial digital television broadcasting: ARIB technical report); ARIB TR-B14 Ver. 3.9 (pp. 4-57, table 12-5, etc.)

Non-patent Document 2: *Dejitaru hoso ni okeru eizo fugoka, onsei fugoka oyobi tajuka hoshiki: Hyojun kikaku* (Video coding, audio coding, and multiplexing specifications for digital broadcasting: ARIB standard); ARIB STD-B32 Ver. 2.2 (pp. 55-56, etc.)

SUMMARY OF THE INVENTION

Problems to be Solved by the Invention

As described above, the tuning process in Patent Document 1 is problematic in that the process of decoding the encoded streams starts after the process of receiving multiple items of tuning information is completed, but the time required for this decoding process cannot be shortened, so there is a long wait from the designation of a service to the output of its picture and sound.

The present invention addresses the above problem, with the object of providing a digital broadcast receiving apparatus, a tuning method, and a computer program that achieve a faster tuning process.

Means for Solving the Problem

A digital broadcast receiving apparatus according to a first aspect of the invention includes a signal receiving unit for receiving and demodulating a digital broadcast signal and generating a digital broadcast stream in which a plurality of data packets carrying one or two or more broadcast programs are multiplexed, a tuning information table which is stored in a storage medium, and in which an interrelated plurality of tuning information for each of one or two or more specific broadcast programs is recorded as plural stored tuning information, a data separating unit for executing a pre-filtering process, based on the stored tuning information, to separate an encoded stream of the tuned broadcast program and an interrelated plurality of latest tuning information related to the encoded stream from the digital broadcast stream, a decoding unit for performing a decoding process on the encoded stream separated by the data separating unit to generate broadcast program data, and a tuning control unit for concurrently executing a first reception confirmation process to decide whether or not first tuning information included in the latest tuning information is consistent with the stored tuning information and a second reception confirmation process to decide whether or not second tuning information in the latest tuning information is consistent with the stored tuning information, the second tuning information having greater relevance than the first tuning information to the encoded stream. The tuning control unit executes the first and second reception confirmation processes concurrently with the decoding process, continues the decoding process when it decides, in the first reception confirmation process, that the first tuning information is consistent with the stored tuning information and, in the second reception confirmation process, that the second tuning information is consistent with the stored tuning information, and suspends the decoding process when it decides, in the second reception confirmation process, that the second tuning information is inconsistent with the stored tuning information.

A tuning processing method according to a second aspect of the invention receives and demodulates a digital broadcast signal to generate a digital broadcast stream in which a plurality of data packets carrying one or two or more broadcast programs are multiplexed, and selectively generates broadcast program data from the digital broadcast stream. The tuning processing method includes: (a) a step of obtaining stored tuning information corresponding to a tuned broadcast program from a tuning information table in which an interrelated plurality of tuning information related to each of one or two or more specific broadcast programs is recorded as plural stored tuning information; (b) a step of executing a pre-filtering process, based on the stored tuning information obtained from the tuning information table, to separate an encoded stream of the tuned broadcast program and an interrelated plurality of latest tuning information related to the encoded stream from the digital broadcast stream; (c) a step of performing a decoding process on the encoded stream separated by the pre-filtering process, thereby generating the broadcast program data; (d) a step of executing a first reception confirmation process, concurrent with the decoding process, to decide whether or not first tuning information included in the latest tuning information is consistent with the stored tuning information; (e) a step of executing a second reception confirmation process, concurrent with the decoding process and the first reception confirmation process, to decide whether or not second tuning information in the latest tuning information is consistent with the stored tuning information, the second tuning information having greater relevance than the first tuning information to the encoded stream; and (f) a step of continuing the decoding process when it is decided, in the first reception confirmation process, that the first tuning information is consistent with the stored tuning information and, in the second reception confirmation process, that the second tuning information is consistent with the stored tuning information, and suspending the decoding process when it is decided, in the second reception confirmation process, that the second tuning information is inconsistent with the stored tuning information.

A computer program according to a third aspect of the invention causes a processor to execute a tuning process that receives and demodulates a digital broadcast signal to generate a digital broadcast stream in which a plurality of data packets carrying one or two or more broadcast programs are multiplexed, and selectively generates broadcast program data from the digital broadcast stream. The computer program is read from a memory and executed by the processor. The tuning process includes (a) a process for obtaining stored tuning information corresponding to a tuned broadcast program from a tuning information table in which an interrelated plurality of tuning information related to each of one or two or more specific broadcast programs is recorded as plural stored tuning information, (b) a pre-filtering process, based on the stored tuning information obtained from the tuning information table, for separating an encoded stream of the tuned broadcast program and an interrelated plurality of latest tuning information related to the encoded stream from the digital broadcast stream, (c) a decoding process for generating the broadcast program data by decoding the encoded stream separated by the pre-filtering process; (d) a first reception confirmation process, performed concurrently with the decoding process, for deciding whether or not first tuning information included in the latest tuning information is consistent with the stored tuning information; (e) a second reception confirmation process, performed concurrently with the decoding process and the first reception confirmation process, for deciding whether or not second tuning information in the latest tuning information is consistent with the stored tuning information, the second tuning information having greater relevance than the first tuning information to the encoded stream; and (f) a process for continuing the decoding process when it is decided, in the first reception confirmation process, that the first tuning information is consistent with the stored tuning information and, in the second reception confirmation process, that the second tuning information is consistent with the stored tuning information, and suspending the decoding process when it is decided, in the second reception confirmation process, that the second tuning information is inconsistent with the stored tuning information.

Effects of the Invention

The present invention can speed up the tuning process.

MODE FOR CARRYING OUT THE INVENTION

Embodiments of the present invention will now be described with reference to the drawings. The embodiments will be described by using Japanese terrestrial digital broadcasting according to the ARIB standard as an example, but the embodiments are not limited to this example; they are also applicable to non-ARIB broadcasting standards.

Structure of the Digital Broadcast Receiving Apparatus

Figure 1:
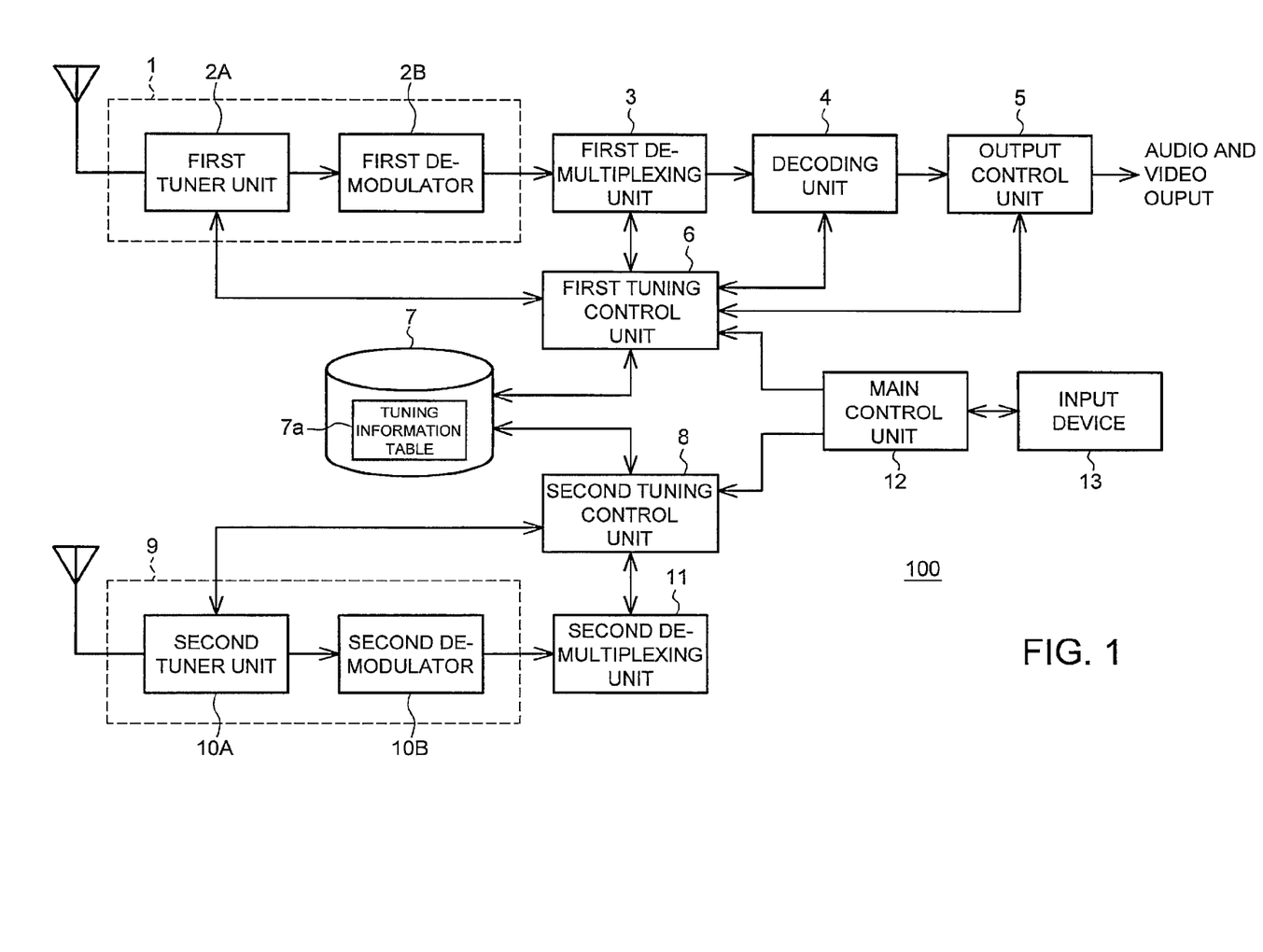
FIG. 1 is a functional block diagram illustrating the general structure of a digital broadcast receiving apparatus according to embodiments of the present invention.

FIG. 1 is a functional block diagram illustrating the general structure of a digital broadcast receiving apparatus 100 in the embodiments of the invention. The digital broadcast receiving apparatus 100 has a first broadcast signal receiving section 1, a first demultiplexing unit 3, a decoding unit 4, an output control unit 5, a first tuning control unit 6, a tuning information table 7a, a main control unit 12, and an input device 13. The first broadcast signal receiving section 1 includes a first tuner unit 2A and a first demodulating unit 2B. The tuning information table 7a is stored in a storage medium 7, such as an HDD (hard disk drive) or non-volatile memory. The operations of the first tuner unit 2A, first demultiplexing unit 3, decoding unit 4, and output control unit 5 are controlled by the first tuning control unit 6.

The digital broadcast receiving apparatus 100 also has a second tuning control unit 8, a second broadcast signal receiving section 9, and a second demultiplexing unit 11. The second broadcast signal receiving section 9 includes a second tuner unit 10A and a second demodulating unit 10B. The second tuner unit 10A, second demodulating unit 10B, and second demultiplexing unit 11 function in the same way as the first tuner unit 2A, first demodulating unit 2B, and first demultiplexing unit 3, respectively. The digital broadcast receiving apparatus 100 thus has two independent broadcast reception systems: a broadcast reception system consisting of the first tuner unit 2A, first demodulating unit 2B, and first demultiplexing unit 3 and a broadcast reception system consisting of the second tuner unit 10A, second demodulating unit 10B, and second demultiplexing unit 11. The second tuning control unit 8 has the function of controlling the operations of the second tuner unit 10A and second demultiplexing unit 11, and also has the function of executing a tuning information scanning process for updating the tuning information recorded in the tuning information table 7a. The tuning information scanning process will be described later.

The main control unit 12 controls the operations of the first tuning control unit 6 and second tuning control unit 8, thereby controlling the entire operation of the digital broadcast receiving apparatus 100. The input device 13 is, for example, a keyboard, a remote controller, or a pointing device (e.g., a mouse). In response to an input operation by the user, the input device 13 outputs information to the main control unit 12, which then executes a control process responsive to the input operation.

In the first broadcast signal receiving section 1, the first tuner unit 2A selects one physical channel designated by the first tuning control unit 6 among a plurality of physical channels (frequency bands) offered by a broadcast station (not shown) and receives a digital broadcast signal (broadcast wave) transmitted on this physical channel. The first tuner unit 2A converts the received digital broadcast signal to an intermediate frequency analog signal which it then A/D converts to generate an OFDM (Orthogonal Frequency Division Multiplexing) modulated signal. The first demodulating unit 2B performs a decoding process and error correction on the OFDM modulated signal, thereby generating a digital broadcast stream, i.e., a transport stream.

The transport stream is a sequence of data blocks called TS packets, each consisting of a fixed-length header, a variable-length adaptation field, and a payload. A packet identifier (PID) is stored in the header of each TS packet. Reference time information referred to as a PCR (program clock reference) is periodically transmitted in the adaptation field; program specific information (PSI) and service information (SI) are periodically transmitted in the payload. Components of the program specific information (PSI) and service information (SI) are used as tuning information in this embodiment.

As described above, the PSI includes four tables: a program association table (PAT), a program map table (PMT), etc. The PAT (first tuning information) includes a program number (program_number) giving a service ID indicating the relevant service, a version number (version_number), and the PID of the PMT (program_map_PID: the PID of the TS packet carrying the PMT relating to the relevant service). The version number of the PAT is a value indicating the update status of the PAT content; the version number is incremented when the PAT content is updated or when an abnormal condition occurs in the broadcast system.

The PMT (second tuning information) includes a program number (program_number) giving a service ID uniquely identifying the relevant service, a version number (version_number), the PID of the PCR (the PID of a TS packet carrying the PCR for the relevant service), and elementary_PIDs (PIDs of TS packets carrying the encoded streams constituting the service). The version number of a PMT is a value indicating the update status of the PMT content; the version number is incremented when the PMT content is updated or when an abnormal condition occurs in the broadcast system. An elementary_PID gives the PID of a TS packet carrying information including an ES (elementary stream) of picture or sound information for the service.

As described above, a PAT includes identification information (program_map_PID) indicting a TS packet in which the related PTM is stored, and a PMT includes identification information indicating TS packets in which the encoded audio and video streams of the service are stored, so in comparison with a PAT, a PMT carries tuning information that has greater relevance to the TS packets including the encoded audio and video streams.

The first demultiplexing unit 3 has the function of extracting only TS packets relating to the relevant service from the transport stream by executing a filtering process on the transport stream by use of the aforementioned tuning information and PIDs, responsive to a filtering instruction from the first tuning control unit 6. TS packets carrying an encoded audio or video stream (PES: Packetized Elementary Stream) are output from the first demultiplexing unit 3 to the decoding unit 4. The decoding unit 4 performs a decoding process on the encoded streams in synchronization with a system clock generated by use of the PCR, thereby generating audio and video signals, and outputs these signals to the output control unit 5. The output control unit 5 controls the output state of the audio and video signals responsive to output settings designated by the first tuning control unit 6.

Figure 2:
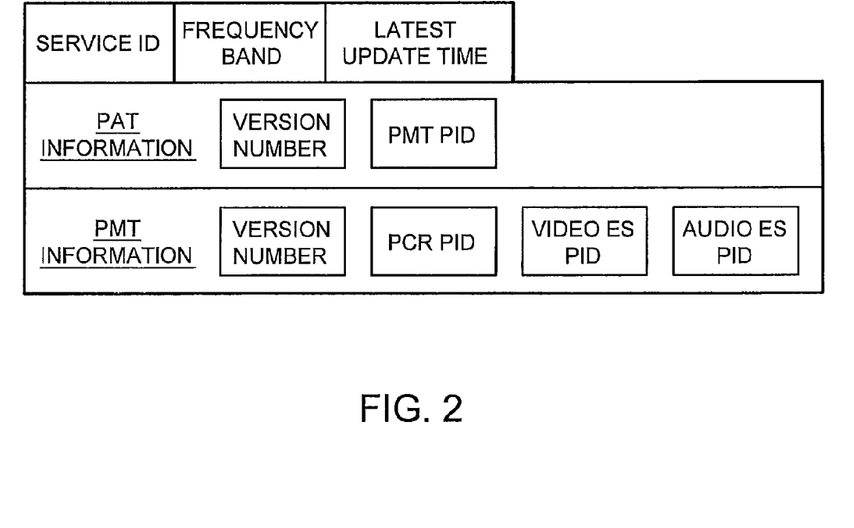
FIG. 2 is a diagram schematically illustrating stored tuning information according to embodiments.

The tuning information table 7a records multiple items of interrelated PAT, PMT, and other tuning information related to individual services as stored tuning information. FIG. 2 is a diagram schematically illustrating the stored tuning information relating to one service. As shown in FIG. 2, the tuning information table 7a records, as stored tuning information, the service ID that uniquely identifies each service, the frequency band (physical channel) in which each service is broadcast, the time of latest update of the stored tuning information, and PAT and PMT information obtained from the PATs and PMTs. The PAT information includes the aforementioned version number and PMT PID; the PMT information includes the aforementioned version number, PCR PID, video ES PID (the PID of a TS packet carrying an encoded video stream), and audio ES PID (the PID of a TS packet carrying an encoded audio stream). The stored tuning information is obtained through a tuning information scanning process that will be described later.

Some or all of the above functional blocks 2B, 3, 4, 6, 8, 10B, 11, and 12 may be configured in an integrated circuit including a microprocessor, ROM (Read Only Memory), RAM (Random Access Memory), timer circuits, input and output interfaces, and special processing units. Some or all of the functions of these functional blocks 2B, 3, 4, 6, 8, 10B, 11, and 12 may also be implemented either by hardware or by a computer program executed by the microprocessor. If some or all of the functions of the functional blocks 2B, 3, 4, 6, 8, 10B, 11, and 12 are implemented by a computer program (which may be an executable file), the microprocessor can implement the functions by loading the computer program from the storage medium 7 and executing the program.

The operation of digital broadcast receiving apparatus 100 having the above structure will be described below.

First Embodiment

Figure 3:
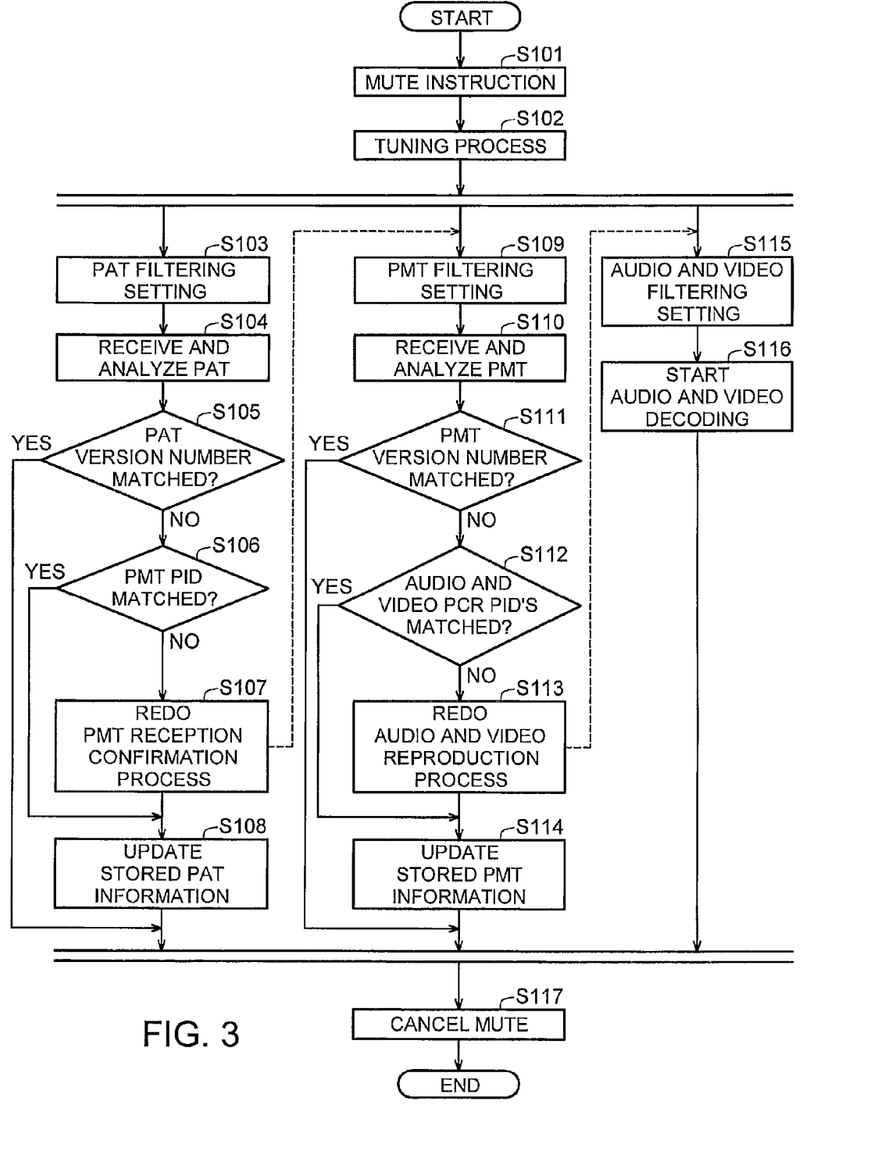
FIG. 3 is a flowchart illustrating a procedure for the tuning process in a first embodiment according to the present invention.

FIG. 3 is a flowchart illustrating a procedure for the tuning process in the first embodiment according to the present invention. The flow of the tuning process will be described below with reference to FIG. 3. First, when a tuning instruction is sent from the main control unit 12 to the first tuning control unit 6 by specification of a service ID, the first tuning control unit 6 issues a mute instruction to the output control unit 5, thereby switching the operating state of the output control unit 5 from its normal state to the mute state (step S101). Here, the normal state means a state in which decoding processes are carried out and resulting decoded audio and video signals are output, while the mute state means a state in which the decoding processes are carried out but the resulting decoded audio and video signals are not output. The mute state prevents a confused picture or sound from being presented to the user during the tuning process.

Next, by referring to the tuning information table 7a, the first tuning control unit 6 obtains the value of the physical channel (frequency band) from the stored tuning information corresponding to the service ID and issues a tuning request to the first tuner unit 2A. When the first tuner unit 2A receives the tuning request, it carries out a frequency tuning process on the designated physical channel (frequency band) (step S102). When the digital broadcast signal on the physical channel becomes receivable, the first tuner unit 2A returns a tuning response to the first tuning control unit 6. Then, when the first tuner unit 2A starts receiving the digital broadcast signal, the first demodulating unit 2B performs a decoding process and error correction on the output of the first tuner unit 2A, and outputs the resultant transport stream to the first demultiplexing unit 3.

When the first tuning control unit 6 receives the tuning response from the first tuner unit 2A, as described below, it concurrently carries out a PAT reception confirmation process (steps S103 to S108: first reception confirmation process), PMT reception confirmation process (steps S109 to S114: second reception confirmation process), and audio and video reproduction process (steps S115 and S116).

First, the first tuning control unit 6 obtains the stored tuning information of the service from the tuning information table 7a, and by using the stored tuning information, it concurrently performs a PAT filtering setting (step S103), PMT filtering setting (step S109), and audio and video filtering setting (step S115). The PAT filtering setting is made for the purpose of extracting a TS packet fitting the PAT PID (having a PID value of zero) from the transport stream; the PMT filtering setting is made for the purpose of a extracting a TS packet fitting the PMT PID in the PMT information from the transport stream; the audio and video filtering settings are made for the purpose of extracting TS packets fitting the PCR PID, audio ES PID, and video ES PID in the PMT information (FIG. 2) from the transport stream.

Next, the first tuning control unit 6 gives a decoding start instruction to the decoding unit 4, and waits for a PAT information notification (PAT reception notification) and PMT information notification (PMT reception notification) from the first demultiplexing unit 3.

When the settings in steps S103, S109, and S115 are completed, the first demultiplexing unit 3 checks the PID values of the individual TS packets in the transport stream input from the first demodulating unit 2B and carries out a pre-filtering process by separating the TS packets (encoded data packets) carrying the encoded audio and video streams of the service, and also separating the TS packets (control data packets) carrying the PAT, PMT, and PCR, respectively. The first demultiplexing unit 3 additionally extracts the latest PAT information, PMT information, and encoded streams from the separated TS packets, notifies the first tuning control unit 6 of the latest PAT information and PMT information, and outputs the encoded streams and PCR to the decoding unit 4.

Upon reception of the decoding start instruction, the decoding unit 4 starts the decoding process on the encoded streams input from the first demultiplexing unit 3 (step S116), generates audio and video signals (broadcast program data), and outputs the signals to the output control unit 5. Because the output control unit 5 is in the mute state, it does not output the audio and video signals input from the decoding unit 4 to an external display apparatus (not shown).

When the first tuning control unit 6 receives a PMT reception notification from the first demultiplexing unit 3, it analyzes the latest received PMT and obtains the version number, PCR PID, audio ES PID, and video ES PID included in the latest PMT (step S110). Then the first tuning control unit 6 decides whether or not the latest obtained PMT version number matches the PMT version number in the stored tuning information recorded in the tuning information table 7a (step S111). If the first tuning control unit 6 decides that the latest obtained PMT version number matches the PMT version number in the stored tuning information (YES in step S111), it decides that the content of the PMT information has not been changed and terminates the PMT reception confirmation process.

If, however, the first tuning control unit 6 decides that the latest obtained PMT version number does not match the PMT version number in the stored tuning information (NO in step S111), it proceeds to decide whether or not the latest PCR PID, audio ES PID, and video ES PID match the PIDs in the stored tuning information (step S112). If the first tuning control unit 6 decides that the latest obtained PIDs match the PIDs in the stored tuning information (YES in step S112), it replaces the PMT information of the service recorded in the tuning information table 7a with the latest received PMT information, thereby updating the stored tuning information (recorded PMT information) (step S114). The PMT reception confirmation process then ends.

If the first tuning control unit 6 decides that the latest PIDs do not match the PIDs in the stored tuning information (NO in step S112), it decides that the latest PMT information is inconsistent with the stored tuning information, causes the decoding unit 4 to stop the decoding process that it was carrying out concurrently with the PMT reception confirmation process, and starts the audio and video reproduction process (steps S115 and S116) over again from the beginning (step S113). Even if the audio and video reproduction process has already ended at this time, the first tuning control unit 6 restarts it from the beginning. That is, the first tuning control unit 6 uses the latest PMT information to carry out audio and video filtering settings on the first demultiplexing unit 3 (step S115). After the audio and video filtering settings, the first demultiplexing unit 3 checks the PID value of each TS packet in the transport stream input from the first demodulating unit 2B, and carries out a re-filtering process in which it separates TS packets (encoded data packets) carrying the encoded audio and video streams of the service, and separates PCR-carrying TS packets. The first demultiplexing unit 3 further extracts the encoded streams and PCR from the TS packets separated in the re-filtering process and outputs the encoded streams and PCR to the decoding unit 4. The decoding unit 4 starts the decoding process on the encoded streams input from the first demultiplexing unit 3 (step S116), generates an audio signal and a video signal (broadcast program data), and outputs these signals to the output control unit 5.

After performing the above audio and video filtering setting on the first demultiplexing unit 3 (step S115), the first tuning control unit 6 also updates the stored tuning information (recorded PMT information) (step S114), just as it does when it decides that the latest PIDs match the PIDs in the stored tuning information (YES in step S112). The PMT reception confirmation process then ends.

In the PAT reception confirmation process, upon receiving a PAT reception notification from the first demultiplexing unit 3, the first tuning control unit 6 analyzes the latest received PAT and obtains the version number and PMT ID included in the latest PAT information (step S104). Then the first tuning control unit 6 decides whether or not the obtained PAT version number matches the PAT version number recorded in the tuning information table 7a (step S105). If the first tuning control unit 6 decides that the latest obtained PAT version number matches the PAT version number in the stored tuning information (YES in step S105), it decides that the content of the PAT information has not been changed and terminates the PAT reception confirmation process.

If the first tuning control unit 6 decides that the latest obtained PAT version number does not match the PAT version number in the stored tuning information (NO in step S105), however, it proceeds to decide whether or not the PMT PID included in the latest PST information matches the PMT PID in the stored tuning information (step S106). If the first tuning control unit 6 decides that the latest PID matches the PMT PID in the stored tuning information (YES in step S106), it replaces the PAT information of the service recorded in the tuning information table 7a with the latest received PAT information, thereby updating the stored tuning information (recorded PAT information) (step S108). The PAT reception confirmation process then ends.

If the first tuning control unit 6 decides that the latest PID does not match the PMT PID in the stored tuning information (NO in step S106), however, it decides that the latest PAT information is inconsistent with the stored tuning information and starts the PMT reception confirmation process (third reception confirmation process) over again from the beginning (step S107). That is, the first tuning control unit 6 uses the latest PAT information to carry out a PMT filtering setting on the first demultiplexing unit 3 (step S109). After the PMT filtering setting is completed, the first demultiplexing unit 3 checks the PID value of each TS packet in the transport stream input from the first demodulating unit 2B, and carries out a re-filtering process to separate the TS packets including the latest version of the PMT information from the transport stream. After that the first tuning control unit 6 analyzes the latest PMT version separated by the re-filtering process, and obtains the version number, PCR PID, audio ES PID, and video ES PID (step S110). After that, the procedure in steps S111 to S114 is carried out as above. If the first tuning control unit 6 now decides that the latest PID does not match the PID in the stored tuning information (NO in step S112), it decides that the PMT information has changed, and starts the audio and video reproduction process (steps S115 to A116) over again from the beginning (step S113).

After performing the PMT filtering process (step S109) on the first demultiplexing unit 3, the first tuning control unit 6 updates the stored tuning information (recorded PAT information) (step S108), just as it does when it decides that the latest PID matches the PMT PID in the stored tuning information (YES in step S106). The PAT reception confirmation process then ends.

When the above PAT reception confirmation process, PMT reception confirmation process, and audio and video reproduction process are all done, the first tuning control unit 6 issues a mute-state canceling instruction to the output control unit 5, thereby canceling the mute state and switching the output control unit 5 from the mute state to the normal state (step S117). The sound and picture of the tuned service are thereby presented to the user. This completes the entire tuning process.

Figure 4A:
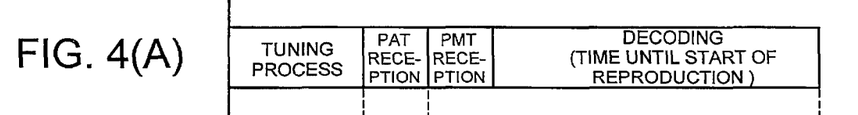
FIGS. 4(A), 4(B), and 4(C) form a diagram schematically illustrating the time required for the tuning process in FIG. 3.
Figure 4B:
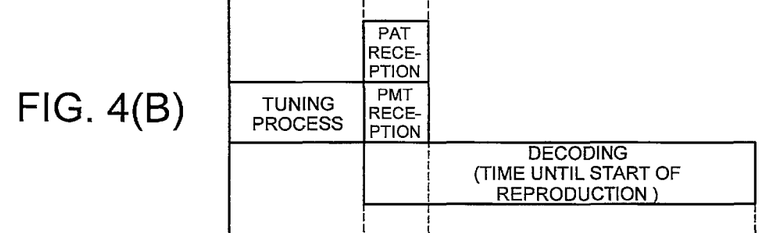
Figure 4C:
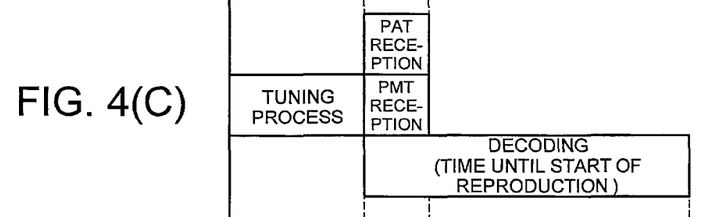

FIGS. 4(A), 4(B), and 4(C) form a diagram schematically illustrating the time (tuning time) required for the tuning process in FIG. 3. FIG. 4(A) indicates the time required by the conventional tuning process; FIG. 4(B) indicates the time required by the tuning process when the audio and video reproduction process (step S113) is redone but the PMT reception confirmation process (step S107) is not redone; FIG. 4(C) indicates the required time when neither the PMT reception confirmation process (step S107) nor the audio and video reproduction process (step S113) is redone. In this drawing, the time required for the tuning process is assumed to consist mainly of four segments: frequency tuning time T1, PAT reception time T2, PMT reception time T3, and decoding time T4.

The frequency tuning time T1 is the time required for the tuning process carried out in the first tuner unit 2A. The PAT reception time is the time required, after the filtering of the transport stream starts, to wait for the reception of a PAT, receive and analyze the PAT, and obtain the necessary information (PAT information including version number, PMT ID, etc.); the PMT reception time T3 is the time required, after the filtering of the transport stream starts, to wait for the reception of a PMT, receive and analyze the PMT, and obtain the necessary information (PAT information including version number, PCR PID, video ES PID, etc.). The decoding time T4 is the time required from the start of input of the encoded audio and video streams, separated based on the PMT information, to the decoding unit 4 until decoded output starts; most of this time is spent in waiting for the reception of the sequence of headers required for video decoding and waiting for video synchronization.

The conventional tuning process requires a tuning time (from $t_0$ to $t_5$) equivalent to the simple sum of the processing times (=T1+T2+T3+T4) because the frequency tuning process, PAT reception, PMT reception, and the decoding process are executed sequentially as shown in FIG. 4(A). In contrast, in FIGS. 4(B) and 4(C), PAT reception, PMT reception, and the decoding process are performed concurrently, and their processing times overlap in the period from $t_1$ to $t_2$. In FIG. 4(B), the decoding process is restarted at time $t_2$, so the required time is from $t_0$ to $t_4$, but the required time in FIG. 4(C) is from $t_0$ to $t_3$. The ARIB standard makes the following stipulations:

a) PAT retransmission cycle: 100 msec,
b) PMT retransmission cycle: 100 msec (200 msec for partial reception hierarchy services),
c) Maximum sequence header transmission interval: 500 msec.

Therefore, on the average the decoding time T4 is expected to be longer than the PAT reception time T2 or PMT reception time T3. In the tuning process in FIG. 3, if the PAT reception confirmation process and PMT reception confirmation process end first, so that immediately after the end of the audio and video reproduction process, the audio and video mute state is canceled and output starts as shown in FIG. 4(C), the total processing time required for the tuning process is only of the sum of the frequency tuning time T1 and decoding time T4. Accordingly, compared with the conventional tuning process, the required time is reduced by the sum (=T2+T3) of the PAT reception time T2 and PMT reception time T3, which, from the PAT and PMT retransmission cycles given above, is approximately 100 msec on average and approximately 200 msec at maximum.

If the content of the PMT information has changed but the content of the PAT information has not changed, the PMT version number changes but the PAT version number does not change. In this case, it is necessary to restart the audio and video reproduction process (step S113), carry out audio and video filtering settings again (step S115), and repeat the decoding process. The total time required for the tuning process is then the sum (=T1+T3+T4) of the tuning time T1, PMT reception time T3, and decoding time T4. Accordingly, compared with the conventional tuning process, the required time is reduced by the PAT reception time (=T2), which, from the PAT retransmission cycle given above, is approximately 50 msec on average and 100 msec at maximum.

As seen above, the amount by which the processing time can be shortened in the first embodiment depends on the PAT and PMT retransmission cycles, but the lengths of these cycles vary with the broadcast standard. For example, the ATSC standard, which is employed in the U.S.A. and other countries, specifies a PAT retransmission cycle of 100 msec on average and 400 msec at maximum. Accordingly, when the PAT information and PMT information have not changed since they were recorded, the possible time reduction in comparison with the conventional tuning process is 250 msec on average and 500 msec at maximum; it will be appreciated that the effect in shortening the tuning process time is greater than with the ARIB standard.

As described above, the digital broadcast receiving apparatus 100 in the first embodiment carries out the PAT reception confirmation process (steps S103 to S108), PMT reception confirmation process (steps S109 to S114), and audio and video reproduction process (steps S115 to S116) concurrently. If the PAT and PMT content in the stored tuning information has not changed since the stored tuning information was recorded (YES in step S105, YES in step S111, etc.), the tuning process is carried out very quickly, as shown in FIG. 4(C). If only the PMT content in the stored tuning information has changed since the stored tuning information was recorded (NO in step S111), the tuning process can also be carried out faster than with the conventional tuning processing method, as shown in FIG. 4(B). Moreover, even in this case, if the PIDs match in step S112 (YES in step S112), the audio and video reproduction process is not restarted, resulting in shortened tuning time.

When alterations in the stored tuning information are checked, the PAT version number and PMT version number are used (steps S105 and S111). These version numbers are incremented whenever the PAT information and PMT information are updated, so whether the stored tuning information has been altered can be decided more reliably than by the method of checking for alteration by reference to PIDs. Therefore the likelihood of occurrence of incorrect operations, including output of erroneous audio and video signals, can be lessened.

Second Embodiment

Figure 5:
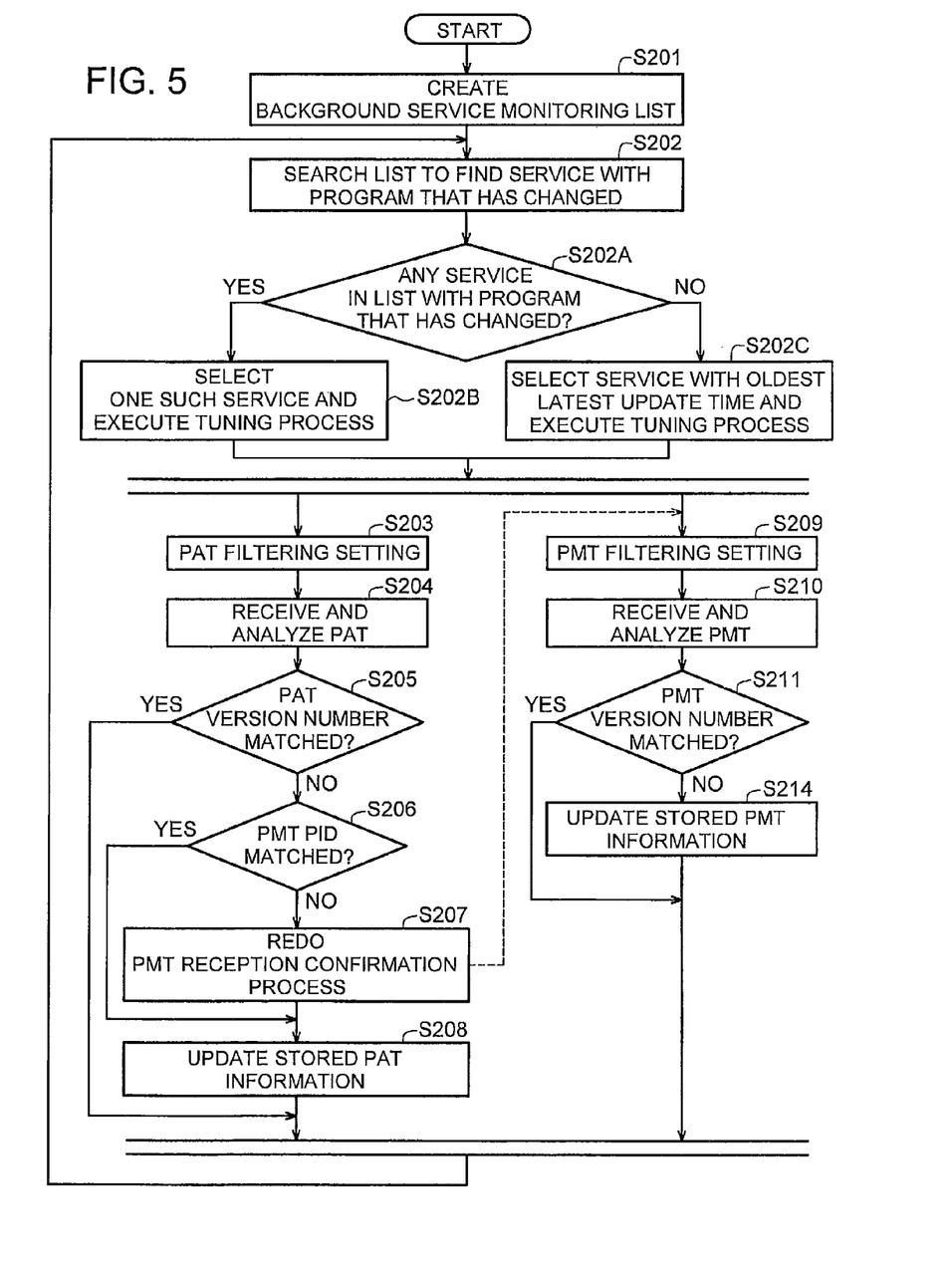
FIG. 5 is a flowchart schematically illustrating a procedure for a tuning information scanning process in a second embodiment according to the present invention.

Next, a second embodiment according to the present invention will be described. FIG. 5 is a flowchart schematically illustrating a procedure for the tuning information scanning process in the digital broadcast receiving apparatus 100 in the second embodiment. The tuning information scanning process in this embodiment is carried out by use of the second tuning control unit 8, second broadcast signal receiving section 9, and second demultiplexing unit 11 in FIG. 1. As described above, the second broadcast signal receiving section 9 and second demultiplexing unit 11 belong to a second broadcast reception system that differs from the first broadcast reception system consisting of the first broadcast signal receiving section 1 and first demultiplexing unit 3, which are used to view and listen to service content. The second embodiment uses the second broadcast reception system to collect tuning information about the services broadcast on each physical channel and store the information in the tuning information table 7a, thereby updating the tuning information table 7a.

First, the second tuning control unit 8 refers to the stored information in the tuning information table 7a and creates a background service monitoring list (step S201) by extracting, from the tuning information table 7a, the stored tuning information about services that are being broadcast on physical channels (frequency bands) other than the physical channel (frequency band) of the service currently being viewed or listened to.

Next, the second tuning control unit 8 obtains the current time and the latest update time (FIG. 2) included in the stored tuning information of each service in the background service monitoring list, refers additionally to the program listings of the services (information obtained beforehand, indicating their program schedules), and searches for services with a program that has changed between the current time and the latest update time, in other words, services that have changed from broadcasting one program to broadcasting another program (step S202). If the current time is expressed by Tc, the latest update time of the stored tuning information of an exemplary service is expressed by Tr, and the individual starting times of the n programs $P_1, P_2, \ldots, P_n$ of the service are expressed by $Tp_1, TP_2, \ldots, Tp_n$, respectively, (n being a positive integer), then the service includes a program that has changed if any $Tp_i$ (where i is any number from 1 to n) satisfies the following condition.

$$Tr < Tp_i < Tc$$

For broadcasts under the ARIB standard, a program listing can be created by collecting the event information tables included in the services. The event information table (EIT), which is included in the service information (SI) defined by the MPEG-2 system, provides information giving program names, broadcast times and dates, program content, and other information about a service.

If the result of the above search process (step S202) is that there are one or more services in the background service monitoring list with a program that has changed (YES in step S202A), the second tuning control unit 8 selects one of the services and issues a tuning request to the second tuner unit 10A based on the frequency band in the stored tuning information to have the frequency tuning process executed (step S202B). Possible methods of selecting one of the services having a program that has changed include, for example, sequentially selecting services in chronological order (oldest first) of the time of recording of the stored tuning information (the latest update time), or selecting the service currently broadcasting the program with the earliest program starting time.

If there is not even one service with a program that has changed in the background service monitoring list (NO in step S202A), the second tuning control unit 8 selects the service with the oldest latest update time from among all the services in the background service monitoring list and issues a tuning request to the second tuner unit 10A based on the frequency band in the stored tuning information to have the frequency tuning process executed (step S202C).

Then, when the second tuner unit 10A returns a tuning response, the second tuning control unit 8 concurrently executes the PAT reception confirmation process (steps S203 to S208) and PMT reception confirmation process (steps S209 to S214) on the basis of the stored tuning information.

First, the second tuning control unit 8 obtains the stored tuning information of the service from the background service monitoring list, and by using this stored tuning information, concurrently performs a PAT filtering setting (step S203) and PMT filtering setting (step S209) on the second demultiplexing unit 11. The PAT filtering setting is made for the purpose of extracting TS packets matching the PAT PID (having a PID value of zero) from the transport stream; the PMT filtering setting is made for the purpose of extracting TS packets having a PID matching the PMT PID in the PMT information (FIG. 2) from the transport stream. Then the second tuning control unit 8 waits for a PAT information notification (PAT reception notification) and PMT information notification (PMT reception notification) from the second demultiplexing unit 11.

When the settings in steps S203 and S209 are completed, the second demultiplexing unit 11 checks the PID values of the TS packets in the transport stream input from the second demodulating unit 10B and carries out a pre-filtering process for by separating the TS packets (control data packets) carrying the PAT and the PMT, respectively, from the transport stream. The second demultiplexing unit 11 additionally extracts the latest PAT information and PMT information from the separated TS packets and notifies the second tuning control unit 8 of the latest PAT information and PMT information.

When the second tuning control unit 8 receives a PMT reception notification from the second demultiplexing unit 11, it analyzes the latest received PMT and obtains the version number included in the latest PMT (step S210). Then the second tuning control unit 8 decides whether the latest obtained PMT version number matches the PMT version number in the stored tuning information (step S211). If the second tuning control unit 8 decides that the latest obtained PMT version number matches the PMT version number in the stored tuning information (YES in step S211), it decides that the content of the PMT information has not changed and terminates the PMT reception confirmation process.

If, however, the second tuning control unit 8 decides that the latest obtained PMT version number does not match the PMT version number in the stored tuning information (NO in step S211), it replaces the PMT information of the service recorded in the tuning information table 7a with the latest received PMT information, thereby updating the stored tuning information (recorded PMT information) (step S214). The time at which the first PMT was received after the start of filtering by the second demultiplexing unit 11 is now recorded as the latest update time in the tuning information table 7a. The PMT reception confirmation process then ends.

In the PAT reception confirmation process, upon receiving a PAT reception notification from the second demultiplexing unit 11, the second tuning control unit 8 analyzes the latest received PAT and obtains the version number and PMT PID included in the latest PAT information (step S204). Then the second tuning control unit 8 decides whether or not the obtained PAT version number matches the PAT version number recorded in the stored tuning information (step S205). If the second tuning control unit 8 decides that the latest obtained PAT version number matches the PAT version number in the stored tuning information (YES in step S205), it decides that the content of the PAT information has not been changed and terminates the PAT reception confirmation process.

If the latest obtained PAT version number does not match the PAT version number in the stored tuning information (NO in step S205), however, the second tuning control unit 8 proceeds to decide whether or not the PMT PID included in the latest PAT information matches the PMT ID in the stored tuning information (step S206). If the second tuning control unit 8 decides that the latest PID matches the PMT PID in the stored tuning information (YES in step S206), it replaces the PAT information of the service recorded in the tuning information table 7a with the latest received PAT information, thereby updating the stored tuning information (step S208). The time when the first PAT was received after the filtering was started by the second demultiplexing unit 11 is recorded as the latest update time in the tuning information table 7a. The PAT reception confirmation process then ends.

If the second tuning control unit 8 decides that the latest PID does not match the PMT PID in the stored tuning information (NO in step S206), however, it decides that the PAT information has changed and is inconsistent with the stored tuning information, and starts the PMT reception confirmation process (steps S209 to S214) over again from the beginning (step S207). That is, the second tuning control unit 8 uses the latest PAT information to carry out a PMT filtering setting on the second demultiplexing unit 11 (step S209). After the PMT filtering setting is completed, the second demultiplexing unit 11 checks the value of the PID of each TS packet in the transport stream input from the second demodulating unit 10B and carries out a re-filtering process to separate the TS packets including the latest version of the PMT information from the transport stream. Then, upon reception of the PMT reception notification from the second demultiplexing unit 11, the second tuning control unit 8 analyzes the latest obtained PMT version separated by the re-filtering process and obtains the version number included in the PMT information (step S210). After that, the second tuning control unit 8 decides whether or not the latest obtained PMT version number matches the PMT version number in the stored tuning information (step S211). If the second tuning control unit 8 decides that the latest obtained PMT version number matches the PMT version number in the stored tuning information (YES in step S211), it decides that the content of the PMT information has not changed and terminates the PMT reception confirmation process. If the second tuning control unit 8 decides that the latest obtained PMT version number does not match the PMT version number in the stored tuning information (NO in step S211), however, it replaces the PMT information of the service stored in the tuning information table 7a with the latest received PMT information, thereby updating the stored tuning information (recorded PMT information) (step S214). The PMT reception confirmation process then ends.

After performing the above PMT filtering setting (step S209) on the second demultiplexing unit 11, the second tuning control unit 8 updates the stored tuning information (recorded PAT information) (step S208) just as when it decides that the latest PID matches the PMT PID in the stored tuning information (YES in step S206). The PAT reception confirmation process then ends.

When the above PAT reception confirmation process and PMT reception confirmation process are all done, the second tuning control unit 8 returns the process to step S202 in order to select the service with the next tuning information to be scanned from the background service monitoring list. Then the second tuning control unit 8 continues collecting tuning information about the services by repeating the process from step S202 to step S214 until it receives a stop command from the main control unit 12. For example, when a tuning instruction for switching the physical channel is given, the main control unit 12 sends a stop command to the second tuning control unit 8.

Figure 6:
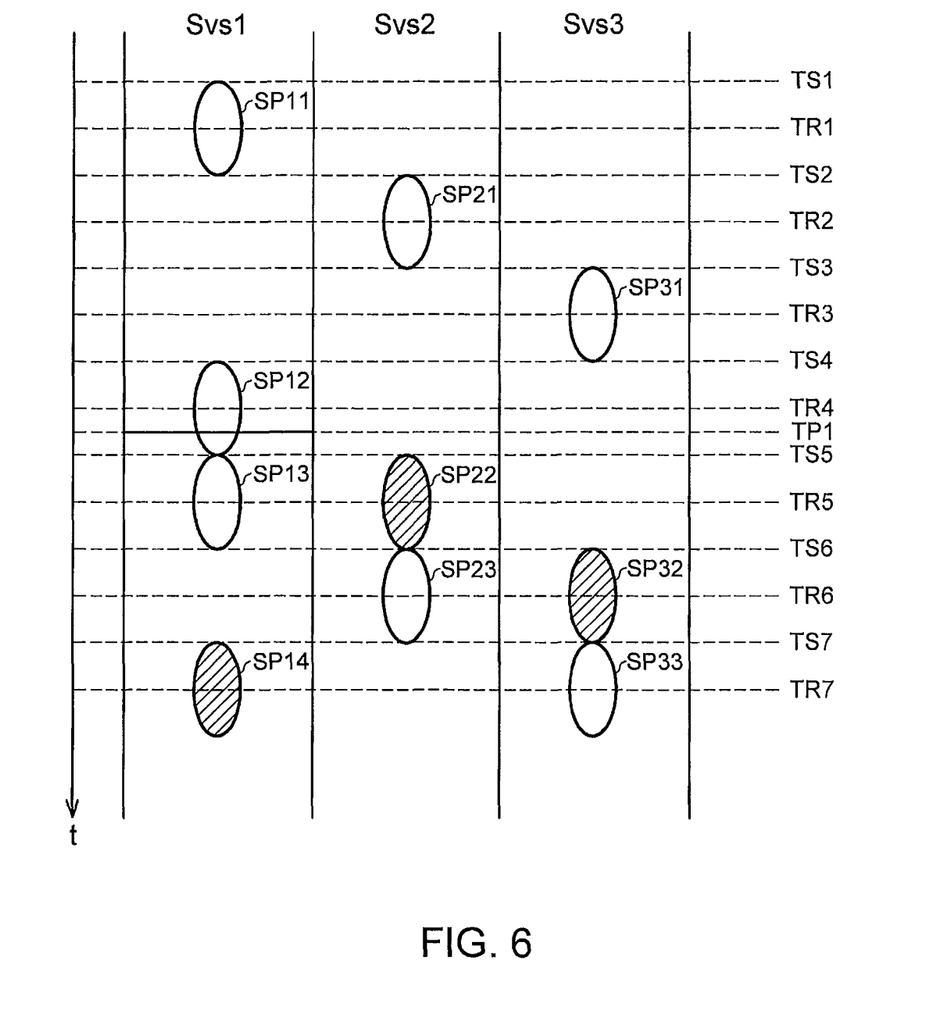
FIG. 6 is a diagram schematically illustrating the service scanning order in the tuning information scanning process in FIG. 5.

FIG. 6 is a drawing schematically illustrating the service scanning order in the above tuning information scanning process. Time t is assumed to flow from top to bottom, and each of the reference characters SP11 to SP14, SP21 to SP23, and SP31 to SP33 indicates the time required for one tuning information scanning process (steps S202 to S214) for one service. TSn indicates the starting time (scan start time) of the n-th scan; TRn indicates the latest update time (tuning information update time) recorded in the n-th scan; TPm (where m is a positive integer) indicates a program starting time in a service. It will be assumed here that there are three services, referred to as Svs1, Svs2, and Svs3, in the background service monitoring list. The service scanning order will now be described with reference to FIG. 6.

Let the current time be TS4, at the start of the fourth scan. The latest update times of the services recorded in the tuning information table 7a are then TR1 for service Svs1, TR2 for service Svs2, and TR3 for service Svs3. For none of these services is there a TPi currently satisfying the condition TR1<TPi<TS4, TR2<TPi<TS4, or TR3<TPi<TS4, so it is decided that the background service monitoring list does not include any service with a program that has changed (NO in step S202A in FIG. 5). Accordingly, the service with the earliest latest update time is selected (step S202C); since TR1<TR2<TR3, service Svs1 is selected as the service to be scanned fourth. In the following tuning information scanning process, which requires processing time SP12, the latest update time of the stored tuning information of service Svs1 becomes TR4.

Suppose next that the current time is TS5 and the fifth scan has started. The latest update times of the individual services recorded in the tuning information table 7a are now TR4 for service Svs1, TR2 for service Svs2, and TR3 for service Svs3. In service Svs1, a new program begins at time TP1, and the condition TR4<TP1<TS5 is satisfied, so in the background service monitoring list, service Svs1 is deemed to be a service in which a program change has occurred (YES in step S202A in FIG. 5). Since service Svs1 is the only service in which a program change has occurred, the tuning information of service Svs1 is scanned, and its latest update time becomes TR5, corresponding to processing time SP13.

Similarly, in the sixth scan there is no service in which a program change has occurred and the latest update time of service Svs2 is the oldest, so the tuning information of service Svs2 is scanned and its latest update time becomes TR6. In the seventh scan there is no service in which a program change has occurred and the latest update time of service Svs3 is the oldest, so the tuning information of service Svs3 is scanned and its latest update time becomes TR7.

As described above, the fourth and subsequent service scans are executed in the order of service Svs1, service Svs1, service Svs2, service Svs3. If the scan were to be performed by always scanning the services in a fixed order regardless of program changes, the fourth and subsequent service scans would be executed in the order of service Svs1, service Svs2, service Svs3, service Svs1, as indicated by processing times SP12, SP22, SP32, SP14 in FIG. 6. If the scans were to be performed in this fixed order, then to re-obtain the tuning information of the service with a program change, two additional scans would have to be performed after the program had changed, but the present embodiment can be seen to re-obtain the tuning information in the scan immediately following the program change. When a program has changed, the tuning information is more likely than usual to have changed, so the tuning information scanning process executed in this embodiment can be expected to reduce the retention span of incorrect tuning information.

In addition, although the number of services in the background service monitoring list is assumed, for simplicity, to be three in the example in FIG. 6, in general more services can be received within a single broadcast area. The tuning information acquisition cycle for each service is obtained by multiplying the number of services in the background service monitoring list by the tuning information scanning processing time per service, so with a fixed scanning order, the more services there are, the longer becomes the expected incorrect information retention span, and the greater becomes the expected relative effect of this embodiment.

As described above, according to the second embodiment, since the digital broadcast receiving apparatus 100 uses the broadcast reception system that is not being used for viewing or listening to collect tuning information about other services, the likelihood that the stored tuning information differs from the latest tuning information can be reduced, increasing the probability of successful fast tuning.

As shown in FIG. 5, in the tuning information scanning process, the PAT reception confirmation process and PMT reception confirmation process are executed concurrently, as in the tuning process, so the time required for obtaining the tuning information for each service can also be reduced. In addition, in the tuning information scanning process, the services are checked to see whether there is a service in which a new program has started (step S202A); a service in which a program change has occurred is deemed to have a high probability of a change in tuning information and is scanned with priority (step S202B). This enables the tuning information to be updated at more appropriate timings than if the services were to be simply scanned in rotation, further lowering the probability that the tuning information has changed since the time of the latest update.

The tuning processing method and tuning information scanning process in the first and second embodiments above are not limited to the ARIB standard but are generally applicable to broadcast standards employing the MPEG-2 standard PSI. Since the MPEG-2 standard PSI is employed in the broadcast standards of many countries worldwide, including the DVB standard adopted in Europe and many other countries, the ATSC standard adopted in the U.S., Canada, etc., the DTMB standard adopted in China, and other standards, the tuning processing method and tuning information scanning process according to the present invention are widely applicable to digital broadcast reception apparatus used overseas.

REFERENCE CHARACTERS 100 digital broadcast receiving apparatus, 1 first broadcast signal receiving section, 2A first tuner unit, 2B first demodulating unit, 3 first demultiplexing unit, 4 decoding unit, 5 output control unit, 6 first tuning control unit, 7 storage medium, 7A tuning information table, 8 second tuning control unit, 9 second broadcast signal receiving section, 10A second tuner, 10B second demodulating unit, 11 second demultiplexing unit, 12 main control unit, 13 input device.

What is claimed is:

1. A digital broadcast receiving apparatus comprising:
a signal receiving unit for receiving and demodulating a digital broadcast signal and generating a digital broadcast stream in which a plurality of data packets carrying one or two or more broadcast programs are multiplexed;
a tuning information table which is stored in a storage medium, and in which an interrelated plurality of tuning information related to each of one or two or more specific broadcast programs is recorded as plural stored tuning information;
a data separating unit for executing a pre-filtering process, based on the stored tuning information, to separate an encoded stream of the tuned broadcast program and an interrelated plurality of latest tuning information related to the encoded stream from the digital broadcast stream;
a decoding unit for performing a decoding process on the encoded stream separated by the data separating unit to generate broadcast program data; and
a tuning control unit for concurrently executing a first reception confirmation process to decide whether or not first tuning information included in the latest tuning information is consistent with the stored tuning information and a second reception confirmation process to decide whether or not second tuning information in the latest tuning information is consistent with the stored tuning information, the second tuning information having greater relevance than the first tuning information to the encoded stream, wherein:
the tuning control unit
executes the first and second reception confirmation processes concurrently with the decoding process;
continues the decoding process when it decides, in the first reception confirmation process, that the first tuning information is consistent with the stored tuning information and, in the second reception confirmation process, that the second tuning information is consistent with the stored tuning information; and
suspends the decoding process when it decides, in the second reception confirmation process, that the second tuning information is inconsistent with the stored tuning information.

2. The digital broadcast receiving apparatus of claim 1, wherein:
when it is decided, in the second reception confirmation process, that the second tuning information is inconsistent with the stored tuning information, the data separating unit further executes a first re-filtering process to separate the encoded stream of the tuned broadcast program from the digital broadcast stream by using the second tuning information; and
the decoding unit performs the decoding process on the encoded stream separated by the first re-filtering process.

3. The digital broadcast receiving apparatus of claim 2, wherein:
when it is decided, in the first reception confirmation process, that the first tuning information is inconsistent with the stored tuning information, the data separating unit executes a second re-filtering process to separate a latest version of the second tuning information from the digital broadcast stream by using the first tuning information; and
the tuning control unit executes a third reception confirmation process, concurrent with the decoding process, to decide whether or not the latest version of the second tuning information separated by the second re-filtering process is consistent with the stored tuning information, causes the decoding process to continue if it decides, in the third reception confirmation process, that the latest version of the second tuning information is consistent with the stored tuning information, and suspends the decoding process if it decides, in the third reception confirmation process, that the latest version of the second tuning information is inconsistent with the stored tuning information.

4. The digital broadcast receiving apparatus of claim 3, wherein:
when it is decided, in the third reception confirmation process, that the latest version of the second tuning information is inconsistent with the stored tuning information, the data separating unit further executes a third re-filtering process to separate the encoded stream of the tuned broadcast program from the digital broadcast stream by using the latest version of the second tuning information; and
the decoding unit performs the decoding process on the encoded stream separated by the third re-filtering process, thereby generating the broadcast program data.

5. The digital broadcast receiving apparatus of claim 1, wherein:
the first tuning information includes
identification information associated with the first tuning information, and
a packet identifier for identifying a data packet carrying the second tuning information in the digital broadcast stream; and
the first reception confirmation process includes
a first decision process for deciding whether or not the identification information is consistent with the stored tuning information, and
a second decision process, executed when it is decided that the identification information is inconsistent with the stored tuning information, for deciding whether or not the packet identifier is consistent with the stored tuning information and, if the packet identifier is decided to be inconsistent with the stored tuning information, for deciding that the first tuning information is inconsistent with the stored tuning information.

6. The digital broadcast receiving apparatus of claim 5, wherein the identification information has a value indicating an update status of content of the first tuning information.

7. The digital broadcast receiving apparatus of claim 6, wherein the value indicating the update status is incremented whenever the content of the first tuning information is updated.

8. The digital broadcast receiving apparatus of claim 5 wherein, when it is decided that the identification information is inconsistent with the stored tuning information in the first decision process, the tuning control unit records the first tuning information in the tuning information table, thereby updating the stored tuning information.

9. The digital broadcast receiving apparatus of claim 1, wherein:
the second tuning information includes
identification information associated with the second tuning information, and
a packet identifier for identifying a data packet carrying the second tuning information in the digital broadcast stream; and
the second reception confirmation process includes
a first decision process for deciding whether or not the identification information is consistent with the stored tuning information, and
a second decision process, executed when it is decided that the identification information is inconsistent with the stored tuning information, for deciding whether or not the packet identifier is consistent with the stored tuning information and, if the packet identifier is decided to be inconsistent with the stored tuning information, for deciding that the second tuning information is inconsistent with the stored tuning information.

10. The digital broadcast receiving apparatus of claim 9, wherein the identification information has a value indicating an update status of content of the second tuning information.

11. The digital broadcast receiving apparatus of claim 10, wherein the value indicating the update status is incremented whenever the content of the second tuning information is updated.

12. The digital broadcast receiving apparatus of claim 9 wherein, when it is decided that the identification information is inconsistent with the stored tuning information in the first decision process, the tuning control unit records the second tuning information in the tuning information table, thereby updating the stored tuning information.

13. The digital broadcast receiving apparatus of claim 1, further comprising:
a monitoring signal receiving unit belonging to a broadcast reception system differing from the broadcast reception system in the signal receiving unit, for receiving and demodulating the digital broadcast signal, thereby generating a digital broadcast monitoring stream;
a monitoring data separating unit that executes a monitoring filtering process to separate an interrelated plurality of tuning information from the digital broadcast monitoring stream; and
a tuning information collecting unit that obtains the plurality of tuning information separated by the monitoring filtering process and records the obtained plurality of tuning information as the plural stored tuning information in the tuning information table.

14. The digital broadcast receiving apparatus of claim 13, wherein the digital broadcast signal received by the monitoring signal receiving unit is a digital broadcast signal carried in a frequency band differing from a frequency band currently being used for viewing and/or listening.

15. The digital broadcast receiving apparatus of claim 13, wherein the tuning information collecting unit refers to a program listing in which programming information is recorded to decide whether or not there has been a program change, and upon deciding that there has been a program change, has the monitoring data separating unit give priority to the broadcast program in the monitoring filtering process.

16. The digital broadcast receiving apparatus of claim 15, wherein upon deciding that there has not been a broadcast program change, the tuning information collecting unit selects broadcast programs in a sequence starting from a broadcast program with the oldest recorded time in the stored tuning information and has the monitoring data separating unit execute the monitoring filtering process on the selected broadcast programs.

17. The digital broadcast receiving apparatus of claim 1, wherein:
the digital broadcast stream is a transport stream as defined by an MPEG-2 system;
the first tuning information is a PAT as defined by the MPEG-2 system; and
the second tuning information is a PMT as defined by the MPEG-2 system.

18. A tuning processing method for receiving and demodulating a digital broadcast signal to generate a digital broadcast stream in which a plurality of data packets carrying one or two or more broadcast programs are multiplexed, and selectively generating broadcast program data from the digital broadcast stream, the tuning processing method comprising:

(a) a step of obtaining stored tuning information corresponding to a tuned broadcast program from a tuning information table in which an interrelated plurality of tuning information related to each of one or two or more specific broadcast programs is recorded as plural stored tuning information;

(b) a step of executing a pre-filtering process, based on the stored tuning information obtained from the tuning information table, to separate an encoded stream of the tuned broadcast program and an interrelated plurality of latest tuning information related to the encoded stream from the digital broadcast stream;

(c) a step of performing a decoding process on the encoded stream separated by the pre-filtering process, thereby generating the broadcast program data;

(d) a step of executing a first reception confirmation process, concurrent with the decoding process, to decide whether or not first tuning information included in the latest tuning information is consistent with the stored tuning information;

(e) a step of executing a second reception confirmation process, concurrent with the decoding process and the first reception confirmation process, to decide whether or not second tuning information in the latest tuning information is consistent with the stored tuning information, the second tuning information having greater relevance than the first tuning information to the encoded stream; and (f) a step of continuing the decoding process when it is decided, in the first reception confirmation process, that the first tuning information is consistent with the stored tuning information and, in the second reception confirmation process, that the second tuning information is consistent with the stored tuning information, and suspending the decoding process when it is decided, in the second reception confirmation process, that the second tuning information is inconsistent with the stored tuning information.

19. The tuning processing method of claim 18, further comprising:

(g) a step of executing a first re-filtering process to separate the encoded stream of the tuned broadcast program from the digital broadcast stream by using the second tuning information when it is decided, in the second reception confirmation process, that the second tuning information is inconsistent with the stored tuning information; and (h) a step of performing the decoding process on the encoded stream separated by the first re-filtering process.

20. The tuning processing method of claim 19, further comprising:

(i) a step of executing a second re-filtering process to separate a latest version of the second tuning information from the digital broadcast stream by using the first tuning information when it is decided, in the first reception confirmation process, that the first tuning information is inconsistent with the stored tuning information;

(j) a step of executing a third reception confirmation process, concurrent with the decoding process, to decide whether or not the latest version of the second tuning information separated by the second re-filtering process is consistent with the stored tuning information; and (k) a step of continuing the decoding process when it is decided, in the third reception confirmation process, that the latest version of the second tuning information is consistent with the stored tuning information, and suspending the decoding process when it is decided, in the third reception confirmation process, that the latest version of the second tuning information is inconsistent with the stored tuning information.

21. The tuning processing method of claim 20, further comprising:

(m) a step of executing a third re-filtering process to separate the encoded stream of the tuned broadcast program from the digital broadcast stream by using the latest version of the second tuning information when it is decided, in the third reception confirmation process, that the latest version of the second tuning information is inconsistent with the stored tuning information; and (n) a step of performing the decoding process on the encoded stream separated by the third re-filtering process, thereby generating the broadcast program data.

22. The tuning processing method of claim 18, further comprising:

(o) a step of obtaining a digital broadcast monitoring stream generated by use of a broadcast reception system differing from a broadcast reception system that receives and demodulates a digital broadcast corresponding to the tuned broadcast program;

(p) a step of executing a monitoring filtering process to separate an interrelated plurality of tuning information from the digital broadcast monitoring stream; and (q) a step of recording the plurality of tuning information separated by the monitoring filtering process in the tuning information table as the plural stored tuning information.

23. A computer program product recorded on non-transitory a computer readable memory medium for causing a processor to execute a tuning process that receives and demodulates a digital broadcast signal to generate a digital broadcast stream in which a plurality of data packets carrying one or two or more broadcast programs are multiplexed, and selectively generates broadcast program data from the digital broadcast stream, wherein the computer program product is read from the computer readable memory medium and executed by the processor, and the tuning process includes: (a) a process for obtaining stored tuning information corresponding to a tuned broadcast program from a tuning information table in which an interrelated plurality of tuning information related to each of one or two or more specific broadcast programs is recorded as plural stored tuning information; (b) a pre-filtering process, based on the stored tuning information obtained from the tuning information table, for separating an encoded stream of the tuned broadcast program and an interrelated plurality of latest tuning information related to the encoded stream from the digital broadcast stream; (c) a decoding process for generating the broadcast program data by decoding the encoded stream separated by the pre-filtering process; (d) a first reception confirmation process, performed concurrently with the decoding process, for deciding whether or not first tuning information included in the latest tuning information is consistent with the stored tuning information; (e) a second reception confirmation process, performed concurrently with the decoding process and the first reception confirmation process, for deciding whether or not second tuning information in the latest tuning information is consistent with the stored tuning information, the second tuning information having greater relevance than the first tuning information to the encoded stream; and (f) a process for continuing the decoding process when it is decided, in the first reception confirmation process, that the first tuning information is consistent with the stored tuning information and, in the second reception confirmation process, that the second tuning information is consistent with the stored tuning information, and suspending the decoding process when it is decided, in the second reception confirmation process, that the second tuning information is inconsistent with the stored tuning information.

24. The computer program product of claim 23, wherein the tuning process further includes:
(g) a process for obtaining a digital broadcast monitoring stream generated by use of a broadcast reception system differing from a broadcast reception system that receives and demodulates a digital broadcast corresponding to the tuned broadcast program;
(h) a monitoring filtering process for separating an interrelated plurality of tuning information from the digital broadcast monitoring stream; and
(i) a process for recording the plurality of tuning information separated by the monitoring filtering process in the tuning information table as the plural stored tuning information.

25. A non-transitory computer readable memory medium storing a computer program for causing a processor to execute a tuning process that receives and demodulates a digital broadcast signal to generate a digital broadcast stream in which a plurality of data packets carrying one or two or more broadcast programs are multiplexed, and selectively generates broadcast program data from the digital broadcast stream, wherein the computer program is read from the computer readable memory medium and executed by the processor, and the tuning process includes: (a) a process for obtaining stored tuning information corresponding to a tuned broadcast program from a tuning information table in which an interrelated plurality of tuning information related to each of one or two or more specific broadcast programs is recorded as plural stored tuning information; (b) a pre-filtering process, based on the stored tuning information obtained from the tuning information table, for separating an encoded stream of the tuned broadcast program and an interrelated plurality of latest tuning information related to the encoded stream from the digital broadcast stream; (c) a decoding process for generating the broadcast program data by decoding the encoded stream separated by the pre-filtering process; (d) a first reception confirmation process, performed concurrently with the decoding process, for deciding whether or not first tuning information included in the latest tuning information is consistent with the stored tuning information; (e) a second reception confirmation process, performed concurrently with the decoding process and the first reception confirmation process, for deciding whether or not second tuning information in the latest tuning information is consistent with the stored tuning information, the second tuning information having greater relevance than the first tuning information to the encoded stream; and (f) a process for continuing the decoding process when it is decided, in the first reception confirmation process, that the first tuning information is consistent with the stored tuning information and, in the second reception confirmation process, that the second tuning information is consistent with the stored tuning information, and suspending the decoding process when it is decided, in the second reception confirmation process, that the second tuning information is inconsistent with the stored tuning information.

26. The non-transitory computer readable memory medium of claim 25, wherein the tuning process further includes: (g) a process for obtaining a digital broadcast monitoring stream generated by use of a broadcast reception system differing from a broadcast reception system that receives and demodulates a digital broadcast corresponding to the tuned broadcast program; (h) a monitoring filtering process for separating an interrelated plurality of tuning information from the digital broadcast monitoring stream; and (i) a process for recording the plurality of tuning information separated by the monitoring filtering process in the tuning information table as the plural stored tuning information.

* * * * *